S. J. TELLER.
POWER TRANSMISSION MECHANISM.
APPLICATION FILED JAN. 13, 1917.
1,323,334.
Patented Dec. 2, 1919.
3 SHEETS—SHEET 2.
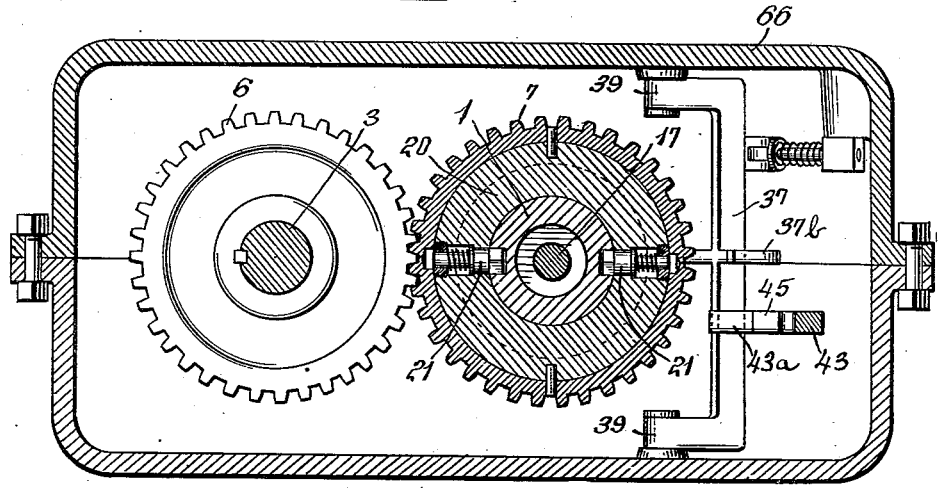
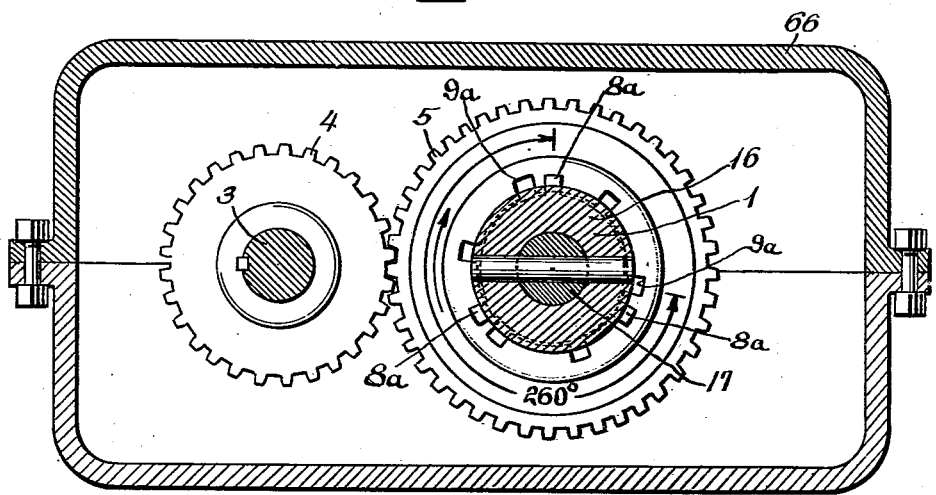
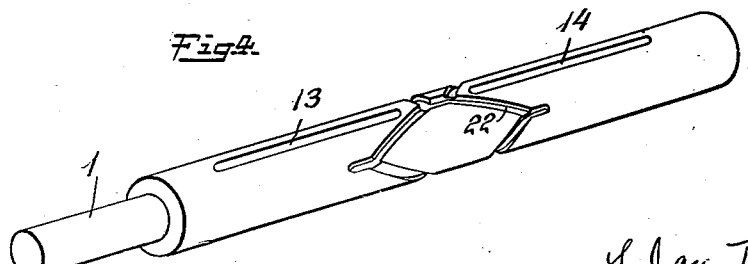
INVENTOR
S. Jay Teller S. J. TELLER.
POWER TRANSMISSION MECHANISM.
APPLICATION FILED JAN. 13, 1917.
1,323,334.
Patented Dec. 2, 1919.
3 SHEETS—SHEET 3.
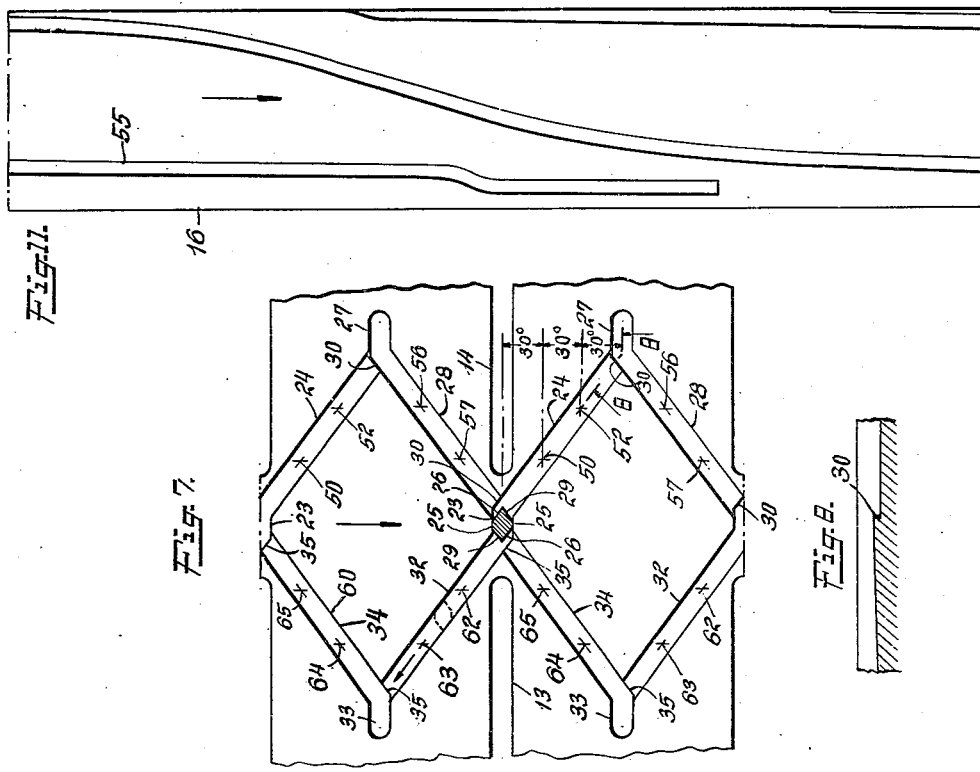
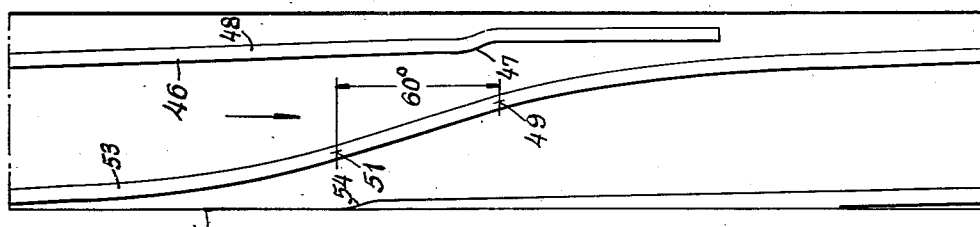
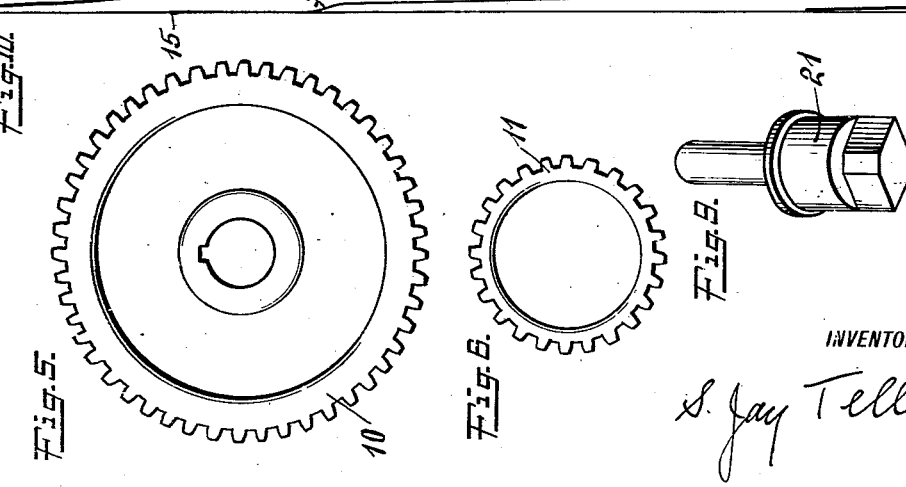
INVENTOR
S. Jay Teller

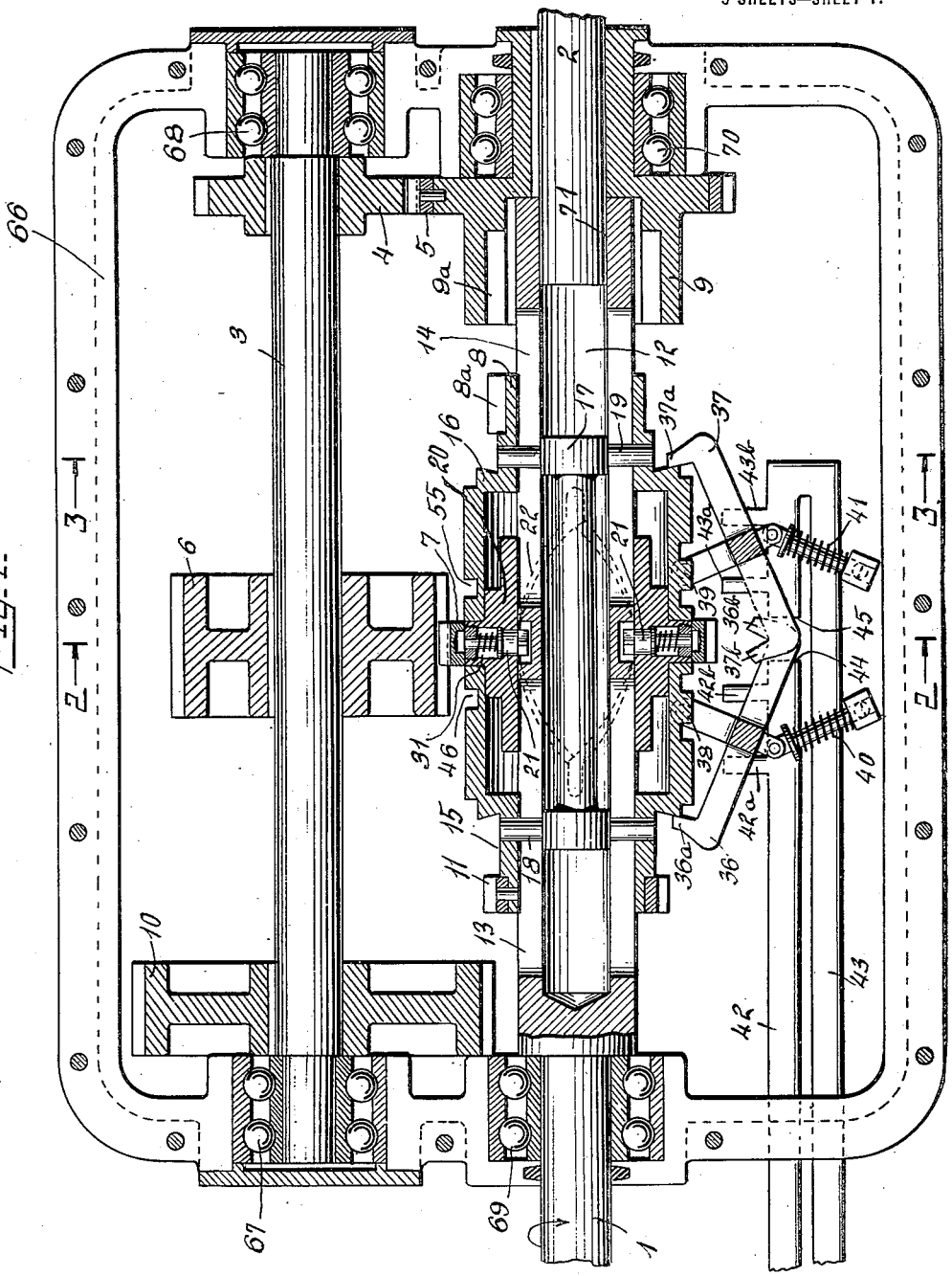

UNITED STATES PATENT OFFICE.

SPENCER JAY TELLER, OF BROOKLYN, NEW YORK, ASSIGNOR TO NILES-BEMENT-POND COMPANY, OF NEW YORK, N. Y., A CORPORATION OF NEW JERSEY.

POWER-TRANSMISSION MECHANISM.

1,323,334.   Specification of Letters Patent.   Patented Dec. 2, 1919.

Application filed January 13, 1917. Serial No. 142,187.

*To all whom it may concern:*

Be it known that I, SPENCER JAY TELLER, a citizen of the United States, residing at Brooklyn, county of Kings, and State of New York, have invented certain new and useful Improvements in Power-Transmission Mechanism, of which the following is the specification, reference being had therein to the accompanying drawings.

A mechanism embodying the invention comprises two movable devices and at least one train of power transmitting elements adapted to connect them and capable of being brought into or out of operation as required. Usually at least two such trains are provided. The manner or rate of movement of one of the devices can be changed relatively to the manner or rate of movement of the other, such a change being brought about when one of the trains of power transmitting elements is brought into or out of operation, or when one train is brought into operation and another is simultaneously brought out of operation. If but one such train is provided and one of the devices is moving at a constant speed then the change in the manner or rate of movement of the other is a change from zero speed to a speed definitely related to the speed of the first device or vice versa. If two trains of power transmitting elements are provided the change in the manner or rate of movement of the second device may be a change from one direction of movement to the opposite direction or it may be a change from one speed to another speed in the same direction.

A change speed gearing can be considered as constituting a typical mechanism of the class defined above and for the sake of convenience reference will be herein had principally to such a gearing, but it will be understood that the invention in its broader phases is applicable to other mechanisms of the class defined.

The principal object of this invention is to provide in mechanism of the class defined means whereby one or more trains of power transmitting elements can be brought into and out of operation without shock and without interrupting the transmission of power, the driving and driven devices having their manner or rate of relative movement gradually changed preferably by positively acting means. Other and more specific objects of the invention will be apparent from the following specification and claims.

The invention can be embodied in any of a large number of ways, and in the accompanying drawings, I have shown one embodiment. It will be understood, however, that the embodiment shown has been selected merely for purposes of illustration and is not to be considered as defining or limiting the scope of the invention, the accompanying claims being relied upon for that purpose.

Of the drawings,

Figure 1 is a horizontal sectional view showing a change speed gearing embodying the invention.

Fig. 2 is a transverse vertical sectional view taken along the line 2—2 of Fig. 1.

Fig. 3 is a vertical transverse figure view taken along the line 3—3 of Fig. 1.

Fig. 4 is a detail perspective view of a part of the driving shaft.

Figs. 5 and 6 are detail views of two of the gears.

Fig. 7 is a diagrammatic view showing a development of one of the cams.

Fig. 8 is a fragmentary detail section view taken along the line 8—8 of Fig. 7.

Fig. 9 is a detail perspective view of one of the elements of the mechanism.

Figs. 10 and 11 are diagrammatic views respectively showing developments of two of the cams.

In the construction shown in the drawings, 1 and 2 are shafts from one to the other of which power is to be transmitted. So far as certain features of the invention are concerned, it is immaterial which shaft is the driven shaft and which the driving shaft, but for the sake of simplicity, the shaft 1 will be considered as the driving shaft and 2 as the driven shaft. The direction of rotation is indicated by an arrow in Fig. 1.

Trains of power transmitting elements are provided whereby the motion of the shaft 1 can be transmitted to the shaft 2 to rotate the latter shaft at any selected one of a plurality of speeds it being assumed for the sake of convenience that the speed of the driving shaft 1 is constant. I have illustrated means whereby the driven shaft can be rotated at any one of three speeds but it will be understood that the exact number of speeds may be varied according to the requirements.

As illustrated there is a jack shaft 3 which is operatively connected with the driven shaft 2 by means of meshing spur gears 4 and 5. As illustrated the pitch diameters of the said gears are in the ratio of 2 to 3. The jack shaft 3 also carries a relatively wide gear 6 which meshes with a gear 7 operatively connected with the shaft 1 to be driven thereby. As illustrated the gears 6 and 7 are of the same diameter and each is provided with 36 teeth. It will be clear that with the parts in the positions shown in Fig. 1, power may be transmitted from the shaft 1 through the gears 6 and 7, the jack shaft 3 and the gears 4 and 5 to the shaft 2, the speed of the latter shaft being two-thirds that of the former and therefore two-thirds that of the shaft 1.

Connected with the shaft 1 and slidable, thereon, is a clutch element 8 adapted to engage a mating clutch element 9, connected with the shaft 2. When the clutch elements 8 and 9 are engaged the gears 6 and 7 are out of mesh and power is transmitted directly from the shaft 1 to shaft 2, the two shafts rotating at the same speed.

The jack shaft also carries a gear 10 which is adapted to mesh with a gear 11 slidably mounted on the drive shaft 1. The ratio of the pitch diameters of the gears 10 and 11 is shown as being 2 to 1, the gears having 48 and 24 teeth respectively. When the gear 11 is moved into position to mesh with the gear 10, the gears 6 and 7 are disengaged and power is transmitted to the shaft 3 which rotates at a speed one-half that of the driving shaft 1. The driven shaft 2 is rotated at a speed two-thirds that of the shaft 3 or one-third that of the shaft 1.

In order that the mechanism may be changed or adjusted from one operative position to another without shock, and without losing the power connection between the two shafts 1 and 2, I have provided means whereby the driven element 2 may be accelerated or decelerated with respect to the driven shaft in order to permit the parts of the mechanism to move smoothly into their new positions. Preferably the acceleration or deceleration of the shaft 2 is effected positively by means of power derived from the main driving shaft 1 and in order that the one embodiment of the invention will be fully understood, I have shown in detail a mechanism adapted for effecting the acceleration or deceleration in the way indicated. While reference is had herein to acceleration and deceleration of the driven shaft it will be understood that relative acceleration or deceleration is meant, and that for many classes of work some or all of the actual change of speed may take place in the driving shaft.

The driving shaft 1 is provided with an enlarged end portion, which is bored or otherwise made hollow as indicated at 12. The shaft is provided with two slots 13 and 14 which extend from one side to the other. Mounted on the shaft are two sleeves 15 and 16, these sleeves being connected together by means of a yoke 17 located in the central aperture of the shaft and by means of pins 18 and 19 extending through the yoke. It will be seen that by means of the construction illustrated, the two sleeves 15 and 16 are connected for movement in unison longitudinally of the shaft but are held by the pins 18 and 19 against any angular movement with respect to the shaft. Positioned between the two sleeves 15 and 16 is a hub 20 which is movable on the shaft both longitudinally and angularly. Rigidly mounted on this hub is the aforesaid gear 7.

Movements of the hub 20 longitudinally of the shaft are controlled by the said sleeves 15 and 16 in a manner which will be more fully set forth hereinafter. The angular relation between the said hub and the shaft is determined and controlled by means of pins 21 which project into a cam groove 22 formed in the shaft. This groove is shown in detail in Figs. 7 and 8. The cam has short central longitudinal portions 23, in which the pins 21 are positioned when the hub is in central position as illustrated in Fig. 1. The cam is also provided with portions 24 which are inclined forward with respect to the direction of rotation of the shaft. The portions 24 of the cam join the portions 23 at an angle and the pins 21 are provided with surfaces 25 adapted to engage the sides of the cam groove at 23 and with surfaces 26 adapted to engage the sides of the cam groove at 24. At the right hand and as illustrated in Fig. 7, the cam is provided with short longitudinal portions 27 the walls of which are adapted to engage the surfaces of 25 of the pins 21. The cam is also provided with portions 28 which are also inclined forward with respect to the direction of rotation but at an angle opposite to that of the portions 24. The pins are provided with surfaces 29 adapted to engage the walls of the cam groove at 28. At the forward ends of the portions 24 and 28 of the cam, the bottoms of the groove are inclined upward as illustrated in Fig. 6, to provide shoulders 30. The pins 21 are pressed inward by means of springs 31 which permit them to yield outward to pass over the shoulders 30.

From a consideration of Fig. 7, it will be seen that if the hub 20 with the pins 21 is moved toward the right the pins by their engagement with the portions 24 of the cam will cause the hub to rotate with respect to the shaft in a forward direction, until the portions 27 are reached when the relatively forward rotation will cease. Subsequently, if the hub is moved toward the left, the pins 21 (having passed over the shoulders 30) will follow the portions 28 of the cam and again cause the hub to rotate with respect to the shaft in a forward direction. This forward rotation will continue until the pins reach the portions 23 of the cam.

The cam 22 is also provided with portions 32 which are inclined backward with respect to the direction of rotation, and with short end portions 33 similar to the aforesaid short end portions 27. There are also cam portions 34 which extend from the portions 33 and which are also inclined backward with respect to the direction of rotation, but in the opposite direction from the portions 32. Shoulders 35 are provided similar to the shoulders 30 already mentioned.

It will be seen that if the hub 20 with the pins 21 is moved toward the left the pins by their engagement with the portions 32 of the cam will cause the hub to rotate with respect to the shaft in a backward direction, until the portions 33 are reached when the relatively backward rotation will cease. Subsequently, if the hub is moved toward the right, the pins 21 (having passed over the shoulders 35) will follow the portions 34 of the cam and again cause the hub to rotate with respect to the shaft in a backward direction. This backward rotation will continue until the pins reach the portions 23 of the cam.

As illustrated in Fig. 1, the sleeves 15 and 16 are held in their central positions by means of latches 36 and 37 which are pivoted at 38 and 39 respectively. Preferably for a purpose which will hereinafter more fully appear, each of the latches is double ended, the latch 36 being provided with fingers 36$^a$ and 36$^b$ and the latch 37 being provided with fingers 37$^a$ and 37$^b$. Springs 40 and 41 are provided for holding the latches in their proper positions it being obvious that if either of the latches be moved past the center, the corresponding spring will tend to move it into the position opposite to that shown; that is, with the finger 36$^b$ or 37$^b$ inward and with the finger 36$^a$ or 37$^a$ outward. For moving the latch 36, there is provided a rod 42, provided with fingers 42$^a$ and 42$^b$. For moving the latch 37 there is provided a rod 43 provided with fingers 43$^a$ and 43$^b$. The two rods are provided with surfaces 44 and 45 which are so positioned with respect to each other, that both of the rods cannot be moved at the same time to move the inner ends of both of the latches toward the shaft.

The sleeve 15 is provided with a cam groove 46, a development of which is shown in Fig. 10. When it is desired to change the gearing from the intermediate speed position as shown in Fig. 1, to the high speed or direct drive position with the clutch element 8 and 9 engaged, the rod 43 is moved toward the left, to push the latch 37 past the center. The finger 37$^a$ moves outward thus releasing the sleeve 16 and permitting it to move toward the left. At the same time the finger 37$^b$ moves inward and enters the initial portion of the cam 46. By referring to Fig. 10, it will be clear that the action of the cam when engaged by the finger 37$^b$ is to force the sleeve 15 and all of the parts connected therewith toward the right. The cam is provided with a short sharply inclined portion 47 which serves to quickly bring the pins 21 into the portions 24 of the cam 22. Following the sharply inclined portion 47 is a portion 48 which is very slightly inclined at the outset but which gradually increases in inclination until the point 49 is reached. As illustrated, the point 49 is reached after approximately one revolution but the cam can be varied as required to cause this point to be reached sooner or later. It will be noted that the movement of the sleeve 15 toward the right causes the movement of the hub 20 not only toward the right but also angularly in a forward direction in the manner already described. In other words, the hub 20 and the gear 7 carried thereby are being forced to rotate at a speed faster than that of the drive shaft 1. By the time the finger 37$^b$ has reached the point 49 of the cam 46 the pins 21 have reached the points 50 of the cam 22. From the point 49 to the point 51 the cam 46 is straight and serves to move the sleeve 15 and the connected parts toward the right at a definite uniform rate. At the same time the pins 21 move in the cam 22 from the points 50 to the points 52. The section 49—51 of the cam 46 is at such an angle that the angular speed of the hub 20 while the pins 21 are moving from the points 50 to the points 52, is one-half that of the angular speed of the drive shaft. As this angular speed is to be added to that of the shaft it will be seen that the resultant speed of the hub 20 and of the gear 7 is one and one-half times that of the drive shaft. The gear 6 is accelerated simultaneously with the gear 7 and to the same extent as are also the parts driven thereby, including the shaft 2 and the clutch element 9. As the normal speed of the shaft 2 is two thirds that of the shaft 1, the acceleration to one and one-half its normal speed gives it a resultant speed exactly equal to that of the drive shaft.

As explained in the preceding paragraph, the clutch elements 8 and 9 are made momentarily to rotate at the same speed, this taking place while the pins 21 are moving from the points 50 to 52; but when the point 50 is reached, the clutch element 8 has moved to such a position that it is approximately ready to enter the clutch element 9, and at the same time the gear 7 has reached such a position that it is approximately ready to disengage the gear 6. The gradual acceleration of the clutch element 9 having been completely effected by the time points 50 are reached, continued movement of the elements toward the right (the uniform accelerated speed being momentarily maintained), causes the clutch element 8 to slide smoothly into engagement with the clutch element 9 and the gear 7 to slide smoothly out of engagement with the gear 6. By the time points 52 have been reached by the pins 21, the gear 7 has become completely disengaged from the gear 6 and from there onward the hub 20 with the gear 7 is gradually decelerated and brought back to the normal speed of the drive shaft 1, this deceleration being effected by the portion 53 of the cam 46, which gradually decreases in inclination. The cam 46 is provided at its end with a sharply inclined portion 54 which serves to quickly move the pins 21 into the end portions 27 of the cam 22. When the end of the cam 46 is reached, the finger $37^b$ is pushed still farther inward by the spring 41 taking a position similar to that occupied by the finger $36^a$ as shown in Fig. 1. Thus the finger $37^b$ serves to prevent any movement of the elements toward the left, movement toward the right being prevented by engagement of the pin 19 with the end of its slot.

When it is desired to return from the direct drive to the intermediate speed position as shown in Fig. 1, the rod 43 is moved toward the right thus swinging the latch 37 to move the finger $37^b$ outward and the finger $37^a$ inward. The outward movement of the finger $37^b$ releases the elements for movement toward the left and the inward movement of the finger $37^a$ brings it into a cam groove 55 formed in the sleeve 16, it being understood that the elements are now in positions to the right of those shown in Fig. 1. The cam groove 55 is shown in development in Fig. 11 and is similar to the cam groove 46 except that it is reversed. A detailed description of this groove 55 is not necessary and it is sufficient to point out that the groove serves to move the sleeves toward the left at a gradually increasing rate and to gradually increase the angular speed of the hub 20 and of the gear 7. For this position the speed of the shaft 3 and of the gears carried thereby is one and one-half times that of the shaft 1 and the peripheral speed of the gear 6 is one and one-half times the peripheral speed of the gear 7. By the time the pins 21 reach points 56, the speed of the hub 20 and of the gear 7 have been accelerated to one and one-half times the normal speed and the gear 7 has a peripheral speed the same as that of the gear 6. This increased speed is maintained while the pins 21 move from the points 56 to the points 57 during which time the gear 7 moves into engagement with the gear 6 and the clutch element 8 moves out of engagement with the clutch element 9. By the time the points 57 are reached, the clutch element 8 is entirely disengaged from the clutch element 9 and the hub 20 with the gear 7 and all of the parts driven thereby, including the shaft 2, are gradually decelerated to the normal speed of two-thirds that of the driving shaft. As soon as the finger $37^a$ reaches the end of the cam 55 it is pushed inward to the position shown in Fig. 1, thus serving in cooperation with the finger $36^a$ to lock the elements against longitudinal movement.

As illustrated, the clutch element 8 is provided with three equally spaced keys $8^a$ and the clutch element 9 is provided with six equally spaced grooves $9^a$ adapted to receive the keys. When the initial ends of the cams 46 and 55 are opposite the fingers $37^b$ and $36^b$ the clutch elements are positioned as shown in Figs. 1 and 3 and this will be referred to as the starting position.

When the mechanism is constructed with the elements in the proportions and relations illustrated the shaft 1 and the clutch element 8 make a complete revolution of 360° while the pins 21 are moving to the points 50 or through 30°. It therefore appears that while the element 8 rotates through 360° the gear 7 rotates through 360°+30° or 390° and the element 9 rotates through 390°×⅔ or 260°. Therefore the grooves $9^a$ of the element 9 must be so located that for the starting position one of the grooves is 260° from one of the keys of the element 8 as indicated in Fig. 3.

In returning to intermediate speed, the element 9 is disengaged by the element 8 after rotation through 360°+60° or 420°. Then during the next revolution of the element 8 the gear 7 is rotated through 360°+30° or 390°, and the element 9 is rotated through 390°×⅔ or 260°. A further rotation of 300° is necessary to restore the element 8 to the starting position, and a corresponding rotation of the element 9 through 200° occurs. Thus in returning to intermediate speed the element 8 rotates through 360°+60°+360°+300° or 1080° and the element 9 rotates through 360°+60°+260°+200° or 880°. The difference in the extent of rotation is 200° during the change from high speed to intermediate speed; but the difference was 260° during the change from intermediate speed to high speed. Therefore in order that another groove $9^a$ may occupy the required starting position as shown in Fig. 3, the grooves must be 60° apart and six grooves must be provided.

Similarly it may be shown that the teeth of the gears 6 and 7 must have the proper spacing in order to insure proper meshing upon the return to intermediate position. I have found that for the mechanism shown it is correct to provide 36 teeth for each gear.

When it is desired to change from the intermediate speed position as shown in Fig. 1, to the low speed position, the rod 42 is moved toward the right to swing the latch 36 and move the finger 36$^a$ outward and the finger 36$^b$ inward. The outward movement of the finger 36$^a$ releases the elements for movement toward the left and the inward movement of the finger 36$^b$ brings it into the cam groove 55.

The cam 55 acts in the same way that it did when engaged by the finger 37$^a$ and moves the sleeves toward the left. As the portions 32 and 34 of the cam 22 are at the same angles as the portions 24 and 28, the effect is to bring about a relative angular movement which is one-half that of the angular movement of the shaft 1. However, this movement is in the reverse direction and must be subtracted from the shaft movement thus giving a resultant movement of the hub equal to one-half that of the shaft. By the time the points 62 are reached by the pins 21, the resultant one-half speed movement of the hub 20 has been attained, the gear 6 and all of the parts driven thereby including the gear 10 and the shaft 2 being also rotated at one-half speed. It will be obvious that for the intermediate speed position as illustrated in Fig. 1, the peripheral speed of the gear 10 is twice that of the gear 11. But inasmuch as the gear 10 is now rotating at one-half speed the peripheral speed is the same as that of the gear 11. During the movement of the pins 21 from the points 62 to the points 63, this one-half speed is maintained and the gear 11 slides smoothly into mesh with gear 10 and at the same time the gear 7 slides out of mesh with the gear 6. By the time the points 63 are reached, the gear 7 is completely disengaged from the gear 6 and from there onward the relative backward movement of the hub 20 is decreased thus gradually bringing its speed back to the normal speed of the shaft 1.

As soon as the pin 36$^b$ reaches the end of cam groove 55, it is pushed inward and occupies a position similar to that of the pin 37$^a$ as shown in Fig. 1, thus serving to prevent movement of the elements toward the right. Movement toward the left is prevented by the engagement of the pin 18 with the end of its slot.

When it is desired to return from the low speed to intermediate speed the rod 42 is moved toward the left thus moving the finger 36$^b$ outward and the finger 36$^a$ inward. The outward movement of the finger 36$^b$ releases the elements for movement toward the right and the inward movement of the finger 36$^a$ brings it into the cam groove 46, it being understood that all of the elements are now in positions to the left of the positions shown in Fig. 1. The cam 46 acts in the way which has been heretofore described to move the elements toward the right, the first effect of such movement being to gradually bring the hub 20 and the gear 7 to one-half speed, this one-half speed being attained when the pins 21 reach the points 64. With the elements in position for a low speed drive the peripherial speed of gear 6 is one-half that of the gear 7 and it will be, therefore, obvious that when the speed of the gear 7 is reduced to one-half it will be the same as that of the gear 6. During the movement of the pins 21 from the points 64 to the points 65, this one-half speed is maintained and the gear 7 slides smoothly into engagement with the gear 6 and at the same time the gear 11 slides out of engagement with the gear 10. When the points 65 are reached, the gear 11 is completely disengaged from the gear 10 and from that point onward, the relative backward rotation of the hub 20 and of the gear 7 is decreased, these parts being gradually brought back to the normal speed of the shaft 1, thus gradually increasing the speed of the gear 6 and the parts driven thereby, including the driven shaft 2.

I have found that a correct spacing of the teeth of the gears 10 and 11 is provided when they are formed with 48 and 24 teeth respectively.

The shafts and gears can be supported in any usual or preferred way. As shown there is provided a casing 66 carrying bearings 67 and 68 for the shaft 3, a bearing 69 for the shaft 1 and a bearing 70 for the shaft 2. Preferably the shaft 2 projects into the central aperture of the shaft 1 thus providing a support for the said shaft at 71.

While I have shown in detail and have particularly described one form of change speed gearing, it will be understood that the invention in its broader aspects is applicable not only to other forms of change speed gearing but also to other power transmitting mechanisms of the general class defined at the beginning of this specification.

What I claim is:

1. The combination of two rotatable devices having a definite rotative relationship, a power transmitting train adapted to cause the said devices to have a different definite rotative relationship, means operable to cause the said devices to change gradually and at a definite predetermined rate from the first to the second of the said rotative relationships, and means for causing the said train to become operative when the second said relationship is attained.

2. The combination of two rotatable devices having a definite rotative relationship, a power transmitting train adapted to cause the said devices to have a different definite rotative relationship, means positively driven by one of the said devices for causing them to change gradually and at a definite predetermined rate from the first to the second of the said rotative relationships, and means for causing the said train to become operative when the second said relationship is attained.

3. The combination of two rotatable devices having a definite rotative relationship, a power transmitting train adapted to cause the said devices to have a different definite rotative relationship, and means for causing the said devices to gradually change from the first to the second of the said rotative relationships while the train remains inoperative and for automatically causing the said train to become operative when the second said relationship is attained.

4. The combination of two rotatable devices having a definite rotative relationship, a power transmitting train adapted to cause the said devices to have a different definite rotative relationship, and means for causing the said devices to change gradually and at a definite predetermined rate from the first to the second of the said rotative relationships and for automatically causing the said train to become operative when the second said relationship is attained.

5. The combination of two rotatable devices having a definite rotative relationship, a power transmitting train adapted to cause the said devices to have a different definite rotative relationship, means operable to cause the said devices to change gradually and at a definite predetermined rate from the first to the second of the said rotative relationships and subsequently operable to cause the said devices to change gradually and at a definite predetermined rate from the second to the first of the said rotative relationships and means for causing the said train to become operative when the second said relationship is attained and for subsequently causing the said train to become inoperative when a change is to be made to the first said relationship.

6. The combination of two rotatable devices having a definite rotative relationship, a power transmitting train adapted to cause the said devices to have a different definite rotative relationship, and means operable to cause the said devices to gradually change from the first to the second of the said rotative relationships while the train remains inoperative and to automatically cause the said train to become operative when the second said relationship is attained and subsequently operable to cause the said train to become inoperative and to cause the said devices to gradually change from the second to the first of the said rotative relationships.

7. The combination of two rotatable devices, two alternately operable power transmitting trains respectively adapted to cause the said devices to have different definite rotative relationships, means operable to cause the said devices to change gradually and at a definite predetermined rate from one to the other of the said rotative relationships, and means for causing one of the said trains to become operative and the other to become inoperative when the second relationship is attained.

8. The combination of two rotatable devices, two alternately operable power transmitting trains respectively adapted to cause the said devices to have different definite rotative relationships and means for causing the said devices to gradually change from one to the other of the said rotative relationships and for automatically causing one of the said trains to become operative and the other to become inoperative.

9. The combination of two rotatable devices, two alternately operable power transmitting trains respectively adapted to cause the said devices to have different definite rotative relationships, and means operable to cause the said devices to gradually change at a definite predetermined rate from one to the other of the said rotative relationships and to automatically cause one of the said trains to become operative and the other to become inoperative.

10. The combination of two rotatable devices, two alternately operable power transmitting trains respectively adapted to cause the said devices to have different definite rotative relationships, means operable to cause the said devices to change gradually and at a definite predetermined rate from one to the other of the said rotative relationships and subsequently operable to cause the said devices to change gradually and at a definite predetermined rate from the second to the first of the said rotative relationships, and means for causing one of the said trains to become inoperative and the other to become operative when a change to the second said relationship is made and for subsequently causing the second said train to become inoperative and the first to become operative when a change to the first said relationship is made.

11. The combination of two rotatable devices, two alternately operable power transmitting trains respectively adapted to cause the said devices to have different definite rotative relationships, and means operable to cause the said devices to gradually change from one to the other of the said rotative relationships and to automatically cause one of the said trains to become inoperative and the other to become operative and subsequently operable to cause the second said train to become inoperative and the first to become operative and to cause the said devices to gradually change from the second to the first of the said rotative relationships.

12. The combination of two rotatable devices, two differently speeded positive power transmitting trains each adapted to connect the said devices, and means for transferring the power connection from one to the other of the said trains while positively maintaining a definite power transmission between the said devices.

13. The combination of two rotatable devices, two differently speeded positive power transmitting trains each adapted to connect the said devices, and means for transferring the power connection between the said devices from one to the other of the said trains without interrupting the transmission of power through the said trains.

14. The combination of two rotatable devices, two differently speeded positive power transmitting trains each adapted to connect the said devices, and means for transferring the power connection between the said devices from one to the other of the said trains, the said means causing the second train to become operative before the first becomes inoperative.

15. The combination of two rotatable devices, two differently speeded positive power transmitting trains each adapted to connect the said devices, and means for transferring the power connection gradually and at a definite predetermined rate from one to the other of the said trains while maintaining a positive power transmission relationship between the said devices.

16. The combination of two rotatable devices, two differently speeded positive power transmitting trains each adapted to connect the said devices, and means positively driven by one of the said devices for transferring the power connection from one to the other of the said trains while maintaining a positive power transmission relationship between the said devices.

17. The combination of two rotatable devices, two differently speeded positive power transmitting trains each adapted to connect the said devices, and means for transferring the power connection from one to the other of the said trains and back from the second to the first of the said trains while maintaining a positive power transmission relationship between the said devices.

18. The combination of two rotatable devices, two differently speeded positive power transmitting trains each adapted to connect the said devices, and means for transferring the power connection from one to the other of the said trains and back from the second to the first of the said trains, the said means causing the second train to become operative before the second becomes inoperative and causing the first train to become operative before the second becomes inoperative.

19. The combination of two rotatable devices, two power transmitting trains respectively adapted to cause the said devices to have different speed relationships, means positively driven by one of the said devices for causing them to gradually change from one to the other of the said speed relationships, and means for causing one of the said trains to become operative and the other to become inoperative.

20. The combination of two rotatable devices, two power transmitting trains respectively adapted to cause the said devices to have different speed relationships, and means for causing the said devices to gradually change from one to the other of the said speed relationships and for automatically causing one of the said trains to become operative and the other to become inoperative.

21. The combination of two rotatable devices, two power transmitting trains respectively adapted to cause the said devices to have different speed relationships, and means operable to cause the said devices to gradually change from one to the other of the said speed relationships and to automatically cause one of the said trains to become inoperative and the other to become operative and subsequently operable to cause the second train to become inoperative and the first to become operative and to cause the said devices to gradually change from the second to the first of the said rotative relationships.

22. The combination of driving and driven rotatable devices, two power transmitting trains respectively adapted to cause the driven device to have different definite speeds, means for causing an element of one of the trains to gradually change its speed while maintaining its power transmission relationship and thereby change the driven device from one to the other of the said different speeds, and means for automatically causing the second train to become operative and the first to become inoperative when the second speed of the driven device is attained.

23. The combination of driving and driven rotatable devices, two power transmitting trains respectively adapted to cause the driven device to have different definite speeds, means for causing an element of one of the trains to gradually change its speed while maintaining its power transmission relationship and thereby change the driven device from one to the other of the said different speeds, means for automatically causing the second train to become operative and the first to become inoperative when the second speed of the driven device is attained, and means for causing the said element of one of the trains to gradually change to its original speed after the said train has become inoperative.

24. The combination of driving and driven rotatable devices, two power transmitting trains respectively adapted to cause the driven device to have different definite speeds, means for causing an element of one of the trains to gradually change to a definite modified speed while maintaining its power transmission relationship with the driven shaft and then gradually change back to its original speed, means for automatically causing the second train to become operative and the first to become inoperative when the element attains the said modified speed, and means for automatically causing the second train to become inoperative and the first to become operative when the element again attains the said modified speed.

25. The combination of driving and driven rotatable shafts, two power transmitting trains respectively adapted to cause the driven shaft to have different definite speeds, one of the trains comprising two meshing gears, means for causing one of the gears to gradually change its speed with respect to its shaft and thereby change the driven shaft from one to the other of the said speeds, and means for automatically causing one of the gears to move out of mesh with the other and for causing the other train to become operative when the second speed of the driven shaft is attained.

26. The combination of driving and driven rotatable shafts in alinement with each other, two clutch elements adapted to directly connect the two shafts for rotation at the same speed, means comprising two meshing gears adapted to connect the two shafts for rotation at different speeds, means operable while the said means is in operation for causing one of the gears to gradually change its speed with respect to its shaft and thereby change the speed of the driven shaft to the speed of the driving shaft, and means for automatically causing one of the gears to move out of mesh with the other and for causing the clutch elements to engage when the said shafts are moving at the same speed.

27. The combination of driving and driven rotatable shafts in alinement with each other, two clutch elements adapted to directly connect the two shafts for rotation at the same speed, means comprising two meshing gears adapted to connect the two shafts for rotation at different speeds, means for causing one of the gears to gradually change its speed with respect to its shaft to a definite modified speed corresponding to rotation of the shafts at the same speed and to then gradually change back to its original speed, and means for automatically causing one of the gears to move out of mesh with the other and for causing the clutch elements to engage when the said gear is moving at the said modified speed and for automatically causing the clutch elements to disengage and the gears to mesh when the gear is again moving at the said modified speed.

28. The combination of driving and driven rotatable shafts, two power transmitting trains respectively adapted to cause the driven shaft to have different definite speeds, one of the trains comprising two meshing shaft-mounted gears, means operable while the gears are in mesh for moving one of them longitudinally of its shaft to bring it out of mesh with the other, means dependent upon the longitudinal movement of the gear for rotating it relatively to its shaft and thereby changing the speed of the driven shaft from the speed corresponding to the gear train to the speed corresponding to the other train, and means dependent upon the said longitudinal movement for bringing the other train into operation.

29. The combination of driving and driven rotatable shafts, two power transmitting trains respectively adapted to cause the driven shaft to have different definite speeds, one of the trains comprising two meshing shaft-mounted gears, means for moving one of the gears longitudinally of its shaft in one direction or the other to bring it out or into mesh with the other, means dependent upon the longitudinal movement of the gear for rotating it relatively to its shaft and thereby changing the gear speed to a speed corresponding to the speed of the other train, and means dependent upon the said longitudinal movement for bringing the other train into or out of operation.

30. The combination of a driving shaft provided with a cam groove, a driven shaft, two power transmitting trains respectively adapted to cause the driven shaft to have different definite speeds, one of the trains comprising two meshing gears of which one is mounted on the driving shaft, means operable while the gears are in mesh for moving the shaft-mounted gear longitudinally to bring it out of mesh with the other, means carried by the shaft-mounted gear and coöperating with the cam groove whereby upon longitudinal movement of the gear it is rotated relatively to its shaft, thereby changing the speed of the driven shaft from the speed corresponding to the gear train to the speed corresponding to the other train, and means dependent upon the said longitudinal movement for bringing the other train into operation when the last said speed is attained.

31. The combination of a driving shaft provided with a cam groove having one part inclined in a right hand direction and another part inclined in a left hand direction, a driven shaft, two power transmitting trains respectively adapted to cause the driven shaft to have different definite speeds, one of the trains comprising two meshing gears of which one is mounted on the driving shaft, means operable for moving the shaft-mounted gear longitudinally in one direction or the other to bring it out of or into mesh with the other, means dependent upon the said longitudinal movement for bringing the other train into or out of operation, and means carried by the shaft-mounted gear and coöperating with one part of the cam groove whereby upon longitudinal movement of the gear in one direction it is rotated relatively to its shaft, thereby having its speed changed to a speed corresponding to the speed of the other train and subsequently coöperating with the other part of the cam groove whereby upon longitudinal movement of the gear in the other direction it is rotated relatively to its shaft in the same direction as before, thereby again having its speed changed to a speed corresponding to the speed of the other train.

32. The combination of driving and driven rotatable shafts, two power transmitting trains respectively adapted to cause the driven shaft to have different definite speeds, one of the trains comprising two meshing shaft-mounted gears, means driven by the driving shaft and operable while the gears are in mesh for moving one of them longitudinally of its shaft at a definite rate to bring it out of mesh with the other, means dependent upon the longitudinal movement of the gear for rotating it relatively to its shaft at a definite rate and thereby changing the speed of the driven shaft from the speed corresponding to the gear train to the speed corresponding to the other train, and means dependent upon the said longitudinal movement for bringing the other train into operation.

33. The combination of driving and driven rotatable shafts, two power transmitting trains respectively adapted to cause the driven shaft to have different definite speeds, one of the trains comprising two meshing shaft-mounted gears, means operable while the gears are in mesh for moving one of them longitudinally of its shaft to bring it out of mesh with the other, the said means comprising a cam longitudinally movable with the gear, means dependent upon the longitudinal movement of the gear for rotating it relatively to its shaft and thereby changing the speed of the driven shaft from the speed corresponding to the gear train to the speed corresponding to the other train, and means dependent upon the said longitudinal movement for bringing the other train into operation.

34. The combination of driving and driven rotatable shafts, two power transmitting trains respectively adapted to cause the driven shaft to have different definite speeds, one of the trains comprising two meshing shaft-mounted gears, means for moving one of the gears longitudinally of its shaft in one direction or the other to bring it out of or into mesh with the other, the said means comprising two oppositely formed cams longitudinally movable with the said gear, means dependent upon the longitudinal movement of the gear for rotating it relatively to its shaft and thereby changing the gear speed to a speed corresponding to the speed of the other train, and means dependent upon the said longitudinal movement for bringing the other train into or out of operation.

35. The combination of driving and driven rotatable shafts, two differently speeded trains of power transmitting elements adapted to connect the shafts, one train comprising a gear longitudinally movable and also rotatable on one of the shafts and the other train comprising an element splined to the last said shaft and movable longitudinally with the gear, means for moving the said gear and the said element longitudinally of the shaft to bring the gear out of mesh with its mate and to bring the element into engagement with the next element of the train, and means dependent upon the longitudinal movement of the gear relatively to the shaft to change the speed of the driven shaft from the speed corresponding to the gear train to the speed corresponding to the other train.

36. The combination of driving and driven rotatable shafts, two differently speeded trains of power transmitting elements adapted to connect the shafts, one train comprising a gear longitudinally movable and also rotatable on one of the shafts and the other train comprising an element splined to the last said shaft and movable longitudinally with the gear, means comprising a cam carried by the said element for moving the element and the said gear longitudinally of the shaft to bring the gear out of mesh with its mate and to bring the element into engagement with the next element of the train, and means dependent upon the longitudinal movement of the gear relatively to the shaft to change the speed of the driven shaft from the speed corresponding to the gear train to the speed corresponding to the other train.

37. The combination of two rotatable devices, three differently speeded positive power transmitting trains each adapted to connect the said devices, and means for transferring the power connection from any one to any other of the said trains while maintaining a definite power transmission between the said devices.

38. The combination of two rotatable devices, three differently speeded positive power transmitting trains each adapted to connect the said devices, and means for transferring the power connection between the said devices from any one to any other of the said trains, the said means causing a second train to become operative before the first becomes inoperative.

39. The combination of two rotatable devices, three differently speeded positive power transmitting trains each adapted to connect the said devices, and means positively driven by one of the said devices for transferring the power connection from any one to any other of the said trains while maintaining a definite power transmission relationship between the said devices.

40. The combination of two rotatable devices, three power transmitting trains respectively adapted to cause the said devices to have different speed relationships, means positively driven by one of the said devices for causing them to gradually change from any one to another of the said speed relationships, and means for causing the train corresponding to the first speed relationship to become operative and the train corresponding to the second speed relationship to become inoperative.

41. The combination of driving and driven rotatable devices, three power transmitting trains respectively adapted to cause the driven device to have different definite speeds, means for causing an element of one of the trains to gradually increase or decrease its speed while maintaining its power transmission relationship and thereby change the driven device from one to either of the other speeds, and means for automatically causing the first train to become inoperative and one of the other trains to become operative when the speed of the driven device is increased or decreased to correspond thereto.

42. The combination of driving and driven rotatable devices, three power transmitting trains respectively adapted to cause the driven device to have different definite speeds, means for causing an element of one of the trains to gradually increase or decrease its speed while maintaining its power transmission relationship and thereby change the driven device from one to either of the other speeds, means for automatically causing the first train to become inoperative and one of the other trains to become operative when the speed of the driven device is increased or decreased to correspond thereto, and means for causing the said element of one of the trains to gradually change to its original speed after another train has become operative.

43. The combination of driving and driven rotatable devices, three power transmitting trains respectively adapted to cause the driven device to have different definite speeds, means for causing an element of one of the trains to gradually increase or decrease its speed, one or the other of two definite modified speeds, while maintaining its power transmission relationship with the driven shaft and then gradually change back to its original speed, means for automatically causing the first train to become inoperative and the one of the other trains to become operative when the element attains the corresponding modified speed, and means for automatically causing the last said train to become inoperative and the first to become operative when the element again attains the corresponding modified speed.

44. The combination of driving and driven rotatable shafts, three power transmitting trains respectively adapted to cause the driven shaft to have different definite speeds, one of the trains comprising two meshing gears, means for causing one of the gears to gradually increase or decrease its speed with respect to its shaft and thereby change the driven shaft from one to another of the said speeds, and means for automatically causing one of the gears to move out of mesh with the other and for causing another train to become operative when the said other speed of the driven shaft is attained.

45. The combination of driving and driven rotatable shafts in alinement with each other, two clutch elements adapted to directly connect the two shafts for rotation at the same speed, two power transmitting trains each comprising two meshing gears adapted to connect the two shafts for rotation at different slower speeds, means operable while the faster one of the gear trains is in operation for causing one of the gears thereof to gradually increase or decrease its speed with respect to its shaft and thereby change the speed of the driven shaft to the speed of the driving shaft or to the speed corresponding to the slower gear train and means for automatically causing one of the gears of the faster train to move out of mesh with the other and for causing the clutch elements to engage when the said shafts are moving at the same speed or for causing the slower gear train to become operative when the speed of the driven shaft corresponds thereto.

46. The combination of driving and driven rotatable shafts, three power transmitting trains respectively adapted to cause the driven shaft to have different definite speeds, the intermediately speeded trains comprising two meshing shaft-mounted gears, means operable while the gears are in mesh for moving one of them in either direction longitudinally of its shaft to bring it out of mesh with the other, means dependent upon longitudinal movement in one direction for bringing the faster speeded train into operation and dependent upon longitudinal movement in the other direction for bringing the slower speeded train into operation, and means dependent upon longitudinal movement of the gear in the first direction for rotating it forward relatively to its shaft and thereby increasing the speed of the driven shaft from the intermediate speed to the fast speed and dependent upon longitudinal movement of the gear in the other direction for rotating it backward relatively to its shaft and thereby decreasing the speed of the driven shaft from the intermediate speed to the slow speed.

47. The combination of driving and driven rotatable shafts, three power transmitting trains respectively adapted to cause the driven shaft to have different definite speeds, the intermediately speeded train comprising two meshing shaft-mounted gears, means for moving one of the gears longitudinally of its shaft in either direction from its central position or back in either direction to its central position to bring it out of or into mesh with the other gear, means dependent upon the longitudinal movement at one side of the central position for bringing the faster speeded train into or out of operation and dependent upon the longitudinal movement at the other side of the central position for bringing the slower speeded train into or out of operation and dependent upon the longitudinal movement in either direction at the fast speed side for rotating it forward relatively to its shaft to give it a speed corresponding to the fast speed power train and dependent upon the longitudinal movement in either direction at the slow speed side for rotating it backward relatively to its shaft to give it a speed corresponding to the slow speed power train.

48. The combination of driving and driven rotatable shafts, three differently speeded trains of power transmitting elements adapted to connect the shafts, one train comprising a gear longitudinally movable and also rotatable on one of the shafts and the other trains comprising elements connected together and splined to the last said shaft and movable longitudinally with the gear, means for moving the said gear and the said element longitudinally of the shaft in one direction or the other from a central position to bring the gear out of mesh with its mate and to bring the initial element of one of the other trains into engagement with the next element of the said train, and means dependent upon the longitudinal movement of the gear relatively to the shaft in one direction or the other to increase or decrease the speed of the driven shaft from the speed corresponding to the gear train to the speed corresponding to the train of which the elements are engaged.

In testimony whereof I affix my signature.

S. JAY TELLER.